United States Patent
Ranford et al.

(10) Patent No.: US 8,855,918 B2
(45) Date of Patent: Oct. 7, 2014

(54) METHODS OF ASSISTING A USER WITH SELECTING A ROUTE AFTER A PERSONAL NAVIGATION DEVICE TRANSITIONS FROM DRIVING MODE TO WALKING MODE

(75) Inventors: Paul Ranford, Auckland (NZ); Richard Stanton, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 892 days.

(21) Appl. No.: 12/566,683

(22) Filed: Sep. 25, 2009

(65) Prior Publication Data

US 2011/0077853 A1  Mar. 31, 2011

(51) Int. Cl.
  *G01C 21/00* (2006.01)
  *G06F 17/00* (2006.01)
  *G06F 19/00* (2011.01)
  *G01C 21/26* (2006.01)
  *G01C 21/34* (2006.01)

(52) U.S. Cl.
  CPC ............................ *G01C 21/3423* (2013.01)
  USPC ............ 701/410; 701/23; 701/25; 701/26; 701/433; 701/491; 701/541; 701/538; 340/995.16; 340/988; 340/995.19; 340/944

(58) Field of Classification Search
  USPC ......... 701/201, 410, 526, 23, 24, 25, 26, 408, 701/412, 433, 472, 538, 541; 340/995.16, 340/925, 990, 991, 995.1, 995.19
  See application file for complete search history.

(56) References Cited

U.S. PATENT DOCUMENTS

| | | | |
|---|---|---|---|
| 2001/0021894 A1* | 9/2001 | Sakamoto et al. | 701/209 |
| 2001/0025222 A1* | 9/2001 | Bechtolsheim et al. | 701/209 |
| 2007/0038364 A1* | 2/2007 | Lee et al. | 701/200 |

FOREIGN PATENT DOCUMENTS

TW    200938811    9/2009

\* cited by examiner

*Primary Examiner* — Adam Tissot
(74) *Attorney, Agent, or Firm* — Winston Hsu; Scott Margo

(57) ABSTRACT

A method of assisting a user of a personal navigation device with automatically selecting a route after the personal navigation device transitions from driving mode to walking mode includes detecting a mode transition in the personal navigation device from driving mode to walking mode, recording a vehicle location where the mode transition from driving mode to walking mode occurs, receiving a request from the user to create navigation instructions to a destination location, determining a distance from the current location to the destination location, and guiding the user back to the vehicle location by providing walking instructions with the personal navigation device when the distance from the current location to the destination location is greater than or equal to a threshold distance and then guiding the user to the destination location by providing driving instructions with the personal navigation device.

18 Claims, 4 Drawing Sheets

METHODS OF ASSISTING A USER WITH SELECTING A ROUTE AFTER A PERSONAL NAVIGATION DEVICE TRANSITIONS FROM DRIVING MODE TO WALKING MODE

BACKGROUND OF THE INVENTION

1. Field of the Invention

The invention relates to a personal navigation device, and more particularly, to a method of assisting a user of a personal navigation device with navigating to a destination location either by walking or by driving when the user has parked the car and is traveling by foot.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Personal GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

A common usage scenario for a personal navigation device or other navigation device is to drive to a location, park the vehicle, and then walk to another location after parking. When the user wants to travel to another location, there is a high probability that the user will need to travel back to their vehicle. Moreover, the user will be traveling back to the vehicle by foot.

However, when the user has already entered another destination location into the personal navigation device and is still traveling around by foot, the navigation device will typically offer the user a route that takes the user directly from their current location to their destination location. Thus, the user still needs to find their vehicle on their own before making use of the navigation instructions given by the personal navigation device.

The conventional personal navigation device is often unable to discern that a user has switched from driving mode to walking mode, and therefore cannot offer the user optimum directions for reaching the destination location while considering that the user may wish to return to their vehicle first.

SUMMARY OF THE INVENTION

It is therefore one of the primary objectives of the claimed invention to provide a way to help users with navigating to their next destination location by offering a user that is traveling by foot a choice of walking directly to their destination location or first walking back to their vehicle and then driving to their destination location.

According to an exemplary embodiment of the claimed invention, a method of assisting a user of a personal navigation device with automatically selecting a route after the personal navigation device transitions from driving mode to walking mode is disclosed. The method includes detecting a mode transition in the personal navigation device from driving mode to walking mode, recording a vehicle location where the mode transition from driving mode to walking mode occurs, receiving a request from the user to create navigation instructions to a destination location, determining a distance from the current location to the destination location, and guiding the user back to the vehicle location by providing walking instructions with the personal navigation device when the distance from the current location to the destination location is greater than or equal to a threshold distance and then guiding the user to the destination location by providing driving instructions with the personal navigation device.

According to another exemplary embodiment of the claimed invention, a method of assisting a user of a personal navigation device with automatically selecting a route after the personal navigation device transitions from driving mode to walking mode is disclosed. The method includes detecting a mode transition in the personal navigation device from driving mode to walking mode, recording a vehicle location where the mode transition from driving mode to walking mode occurs, receiving a request from the user to create navigation instructions to a destination location, determining a distance from the vehicle location to the destination location, and guiding the user back to the vehicle location by providing walking instructions with the personal navigation device when the distance from the vehicle location to the destination location is greater than or equal to a threshold distance and then guiding the user to the destination location by providing driving instructions with the personal navigation device.

It is an advantage that the present invention recognizes that the users are traveling by foot, and guides the user back to their vehicle before later guiding the user to their destination location. It is another advantage that the present invention offers the user a choice of walking back to the vehicle to drive to the destination location or walking directly to the destination location. This choice can also be made automatically according to the distance from either the vehicle location or the current location to the destination location for simplifying the navigation process for the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
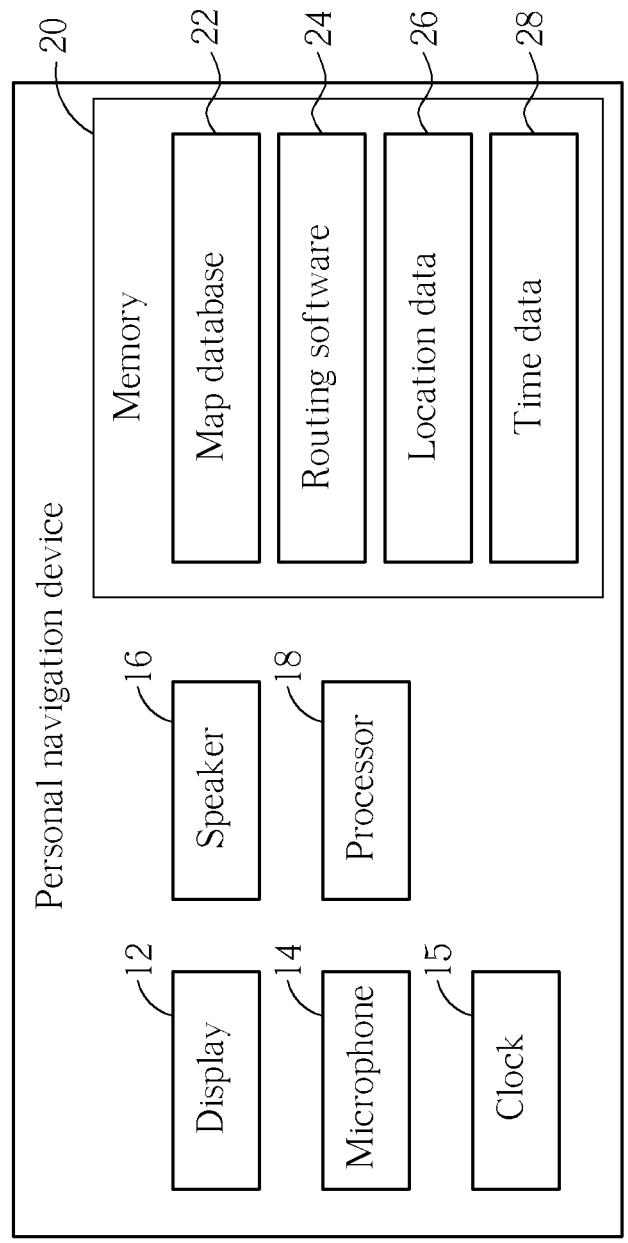
FIG. 1 is a functional block diagram of a personal navigation device according to the present invention.

Please refer to FIG. 1. FIG. 1 is a functional block diagram of a personal navigation device 10 according to the present invention. The personal navigation device 10 has a user interface containing such devices as a display 12, a microphone 14, a clock 15, and a speaker 16. The display 12 can be a touch-sensitive display for allowing a user of the personal navigation device 10 to input commands and data using the display 12. The personal navigation device 10 also contains a processor 18 for controlling operation of the personal navigation device 10 as well as executing routing software 24 stored in memory 20. The memory 20 also stores a map database 22 for storing map data, address data, parking area information, etc. The memory 20 also stores location data 26 and time data 28 for recording the locations and times of various events performed by the personal navigation device 10.

The present invention personal navigation device 10 helps the user by making it easy for the user to plan their journey to a destination location when the user has parked their vehicle and is traveling by foot. When the user parks their vehicle and takes the personal navigation device 10 with them, the personal navigation device 10 can detect this transition from driving mode to walking mode, and automatically change its navigation behavior accordingly.

The personal navigation device 10 recognizes that although the user ultimately wants to reach a particular destination location, the user may not wish to travel there directly, and may instead want guidance in walking back to the user's vehicle before driving to the destination location. Thus, the personal navigation device 10 can use intelligence to offer the user a route to the next destination location once the personal navigation device 10 has detected that the personal navigation device 10 has transitioned from driving mode to walking mode.

The personal navigation device 10 automatically detects the transition from driving mode to walking mode, and then automatically offers the user assistance in returning to the vehicle if necessary. This is not just a case of reversing a journey, as the user may be traveling to a location other than their original starting point.

The user navigates to a first location by vehicle, but then travels the last part of the journey on foot after parking the vehicle. The personal navigation device 10 detects this transition from driving mode to walking mode through one or more of the following hints available to it. First of all, the user may have picked a vehicle parking area as a penultimate waypoint on a most recent journey. This is a very strong suggestion that after leaving the vehicle parking area, the user is now traveling by foot to the ultimate destination. Similarly, the user may have asked the personal navigation device 10 for parking assistance when requesting navigation assistance to the most recent destination location. In this case, the personal navigation device 10 would have then guided the user to the parking area before later guiding the user from the parking area to the destination location.

Other more obvious indications can be given to the personal navigation device 10 for helping the personal navigation device 10 detect the transition between driving mode and walking mode. This transition can be detected if the personal navigation device 10 is removed from a cradle in a vehicle, or if the user manually changed the mode of the personal navigation device from driving mode to walking mode.

Another way to detect the transition between driving mode and walking mode is by determining that the movement of the personal navigation device is consistent with driving movement and then later detecting that the movement of the personal navigation device is consistent with walking movement. Since driving speeds are much higher than walking speeds, the speed at which the personal navigation device 10 is moving can be used as a reliable indicator of driving mode or walking mode. In addition, the routes being traveled on, such as staying on roads versus cutting across parks or fields, can also serve as indicators.

In any case, once the transition from driving mode to walking mode has been detected, the location of the personal navigation device 10 where the transition took place is recorded and stored in the location data 26 section of the memory 20. The current time indicated by the clock 15 can also be stored in the time data 28 section of the memory 20. For convenience, the location of the personal navigation device 10 at which the transition from driving mode to walking mode took place will be referred to as the vehicle location since that is where the vehicle was parked.

When the user is walking around on foot after having parked the vehicle, and sets another destination location into the personal navigation device 10 for requesting navigational assistance to the destination location, the routing software 24 can determine the distance between the current location of the personal navigation device 10 and the destination location. If the distance is greater than a threshold distance, such as 1 km or 2 km, then the personal navigation device 10 can ask the user whether they wish to first return to the vehicle at the vehicle location. The vehicle location can be shown on a map and if available the name of the car park can be shown for convenience. Otherwise, if the user does not wish to return to the vehicle location, or if the distance to the destination location is less than the threshold distance, the user is provided with walking instructions to the destination location.

Alternatively, instead of comparing the distance between the current location and the destination location with the threshold distance, the distance between the vehicle location and the destination location can be compared with the threshold distance instead.

Figure 2:
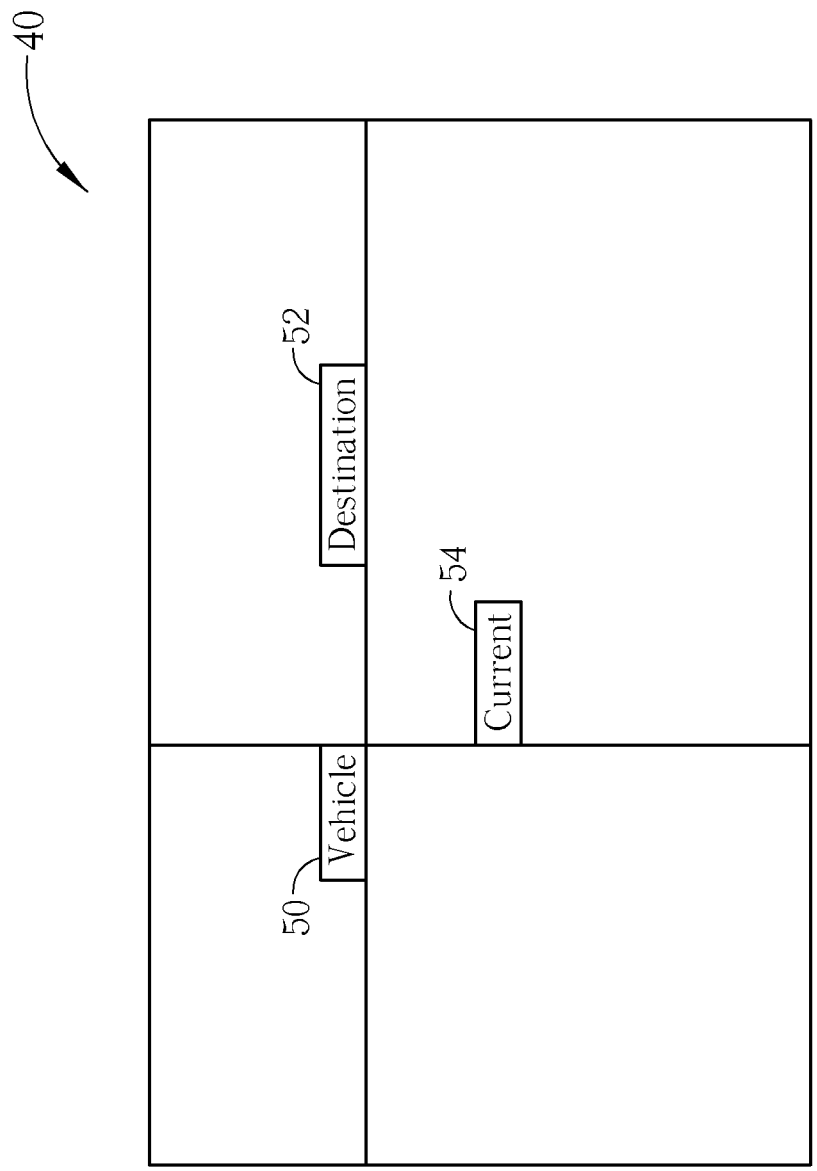
FIG. 2 shows an example map in which the current location of the personal navigation device is near both the vehicle location and the destination location.

Please refer to FIG. 2. FIG. 2 shows an example map 40 in which the current location 54 of the personal navigation device 10 is near both the vehicle location 50 and the destination location 52. In this situation, the distance from the destination location 52 to either the vehicle location 50 or the current location 54 is less than the threshold distance so the user can walk to the destination location 52 directly.

Figure 3:
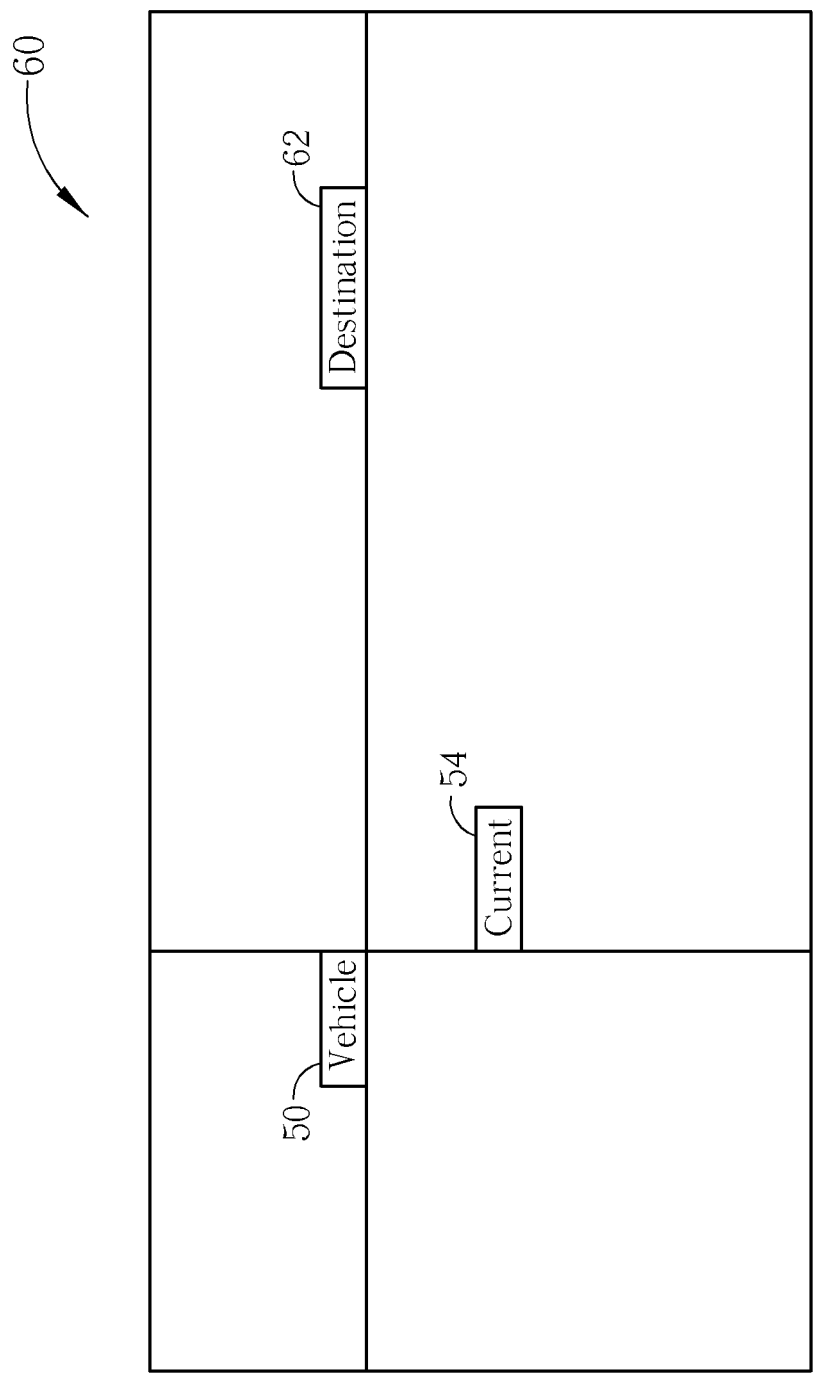
FIG. 3 shows another example map in which the current location of the personal navigation device is near both the vehicle location and the destination location.

Please refer to FIG. 3. FIG. 3 shows another example map 60 in which the current location 54 of the personal navigation device 10 is near the vehicle location 50 but far away from the destination location 62. In this situation, the distance from the destination location 62 to either the vehicle location 50 or the current location 54 is greater than the threshold distance. In this case, the user is asked if they wish to return to the vehicle location 50. If so, the user can be given walking instructions from the current location 54 to the vehicle location 50 and then driving instructions from the vehicle location 50 to the destination location 62.

Figure 4:
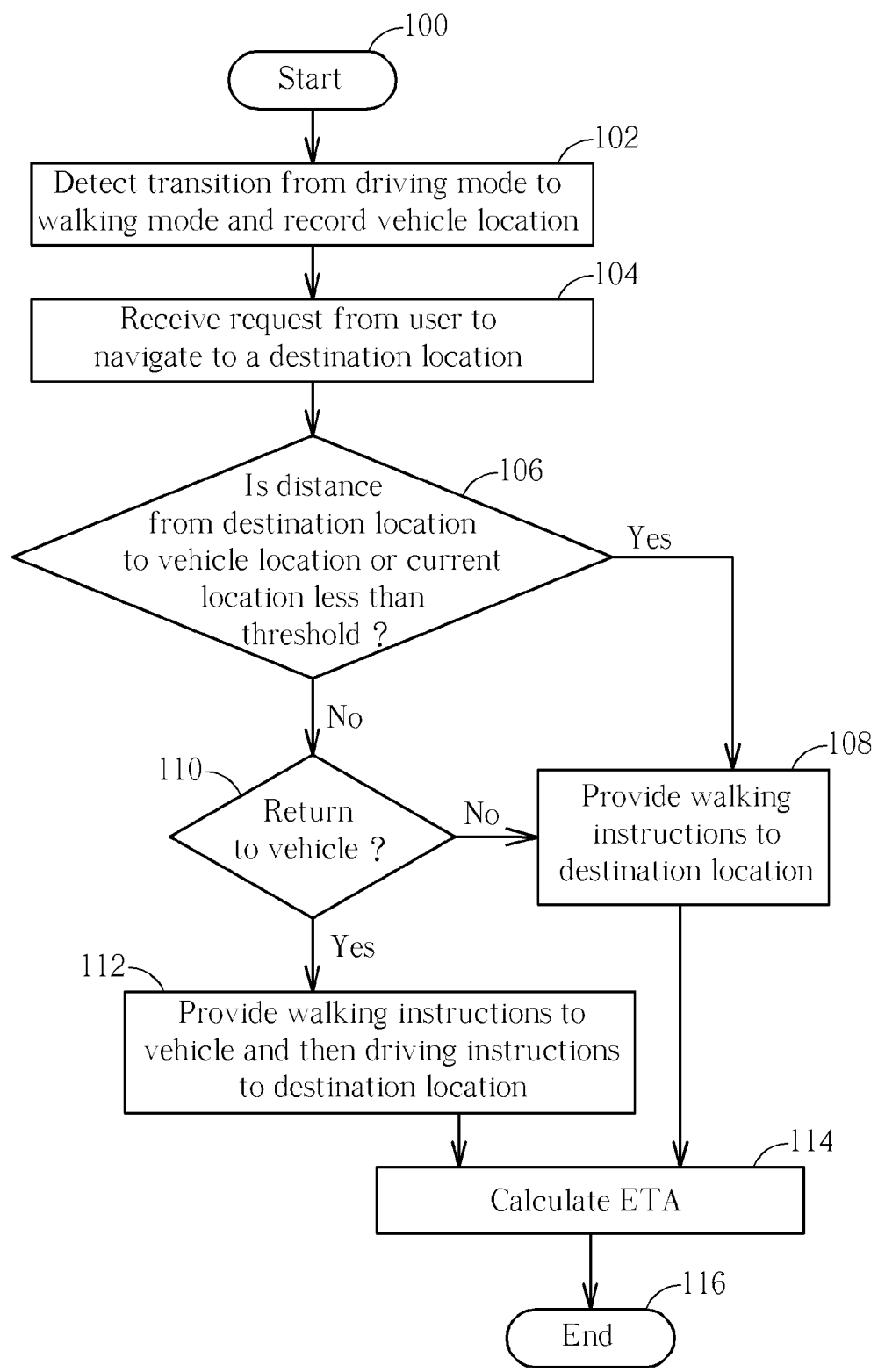
FIG. 4 is a flowchart illustrating the present invention method of assisting the user with automatic route selection after parking their vehicle.

Please refer to FIG. 4. FIG. 4 is a flowchart illustrating the present invention method of assisting the user with automatic route selection after parking their vehicle. Steps contained in the flowchart will be explained below.

Step 100: Start.

Step 102: The personal navigation device 10 detects a transition from driving mode to walking mode, and records the location at which the transition occurred as the vehicle location in the location data 26 section of the memory 20.

Step 104: The personal navigation device 10 receives a request from the user to navigate to a destination location.

Step 106: Determine if the distance from the destination location to the current location or the distance from the destination location to the vehicle location is less than a threshold distance. If so, go to step 108. If not, go to step 110.

Step 108: Provide the user with walking instructions to the destination location. Go to step 114.

Step 110: Determine if the user wishes to return to the vehicle due to the long distance from the destination location to either the current location or the vehicle location. If so, go to step 112. If not, go to step 108.

Step 112: Provide the user with walking instructions to the vehicle location and then provide the user with driving instructions from the vehicle location to the destination location.

Step 114: Calculate the estimated time of arrival for the journey to the destination location while considering the driving time and/or walking time required.

Step 116: End.

When users travel to places that they are very familiar with, for example in the areas surrounding their home, they may turn off the personal navigation device 10 in order to minimize distractions while driving. If the personal navigation device 10 is turned off for any period of time, then the personal navigation device 10 may be later turned on at a location far away from the location at which it was turned off. A significant amount of time may have also elapsed between the time when the personal navigation device 10 was turned off and later turned back on. In these situations, it is unlikely that the user will require navigational assistance in returning to his parked vehicle.

Therefore, the personal navigation device 10 can, upon detecting that the personal navigation device 10 is powered on, compare a location where the personal navigation device 10 is powered on with a location where the personal navigation device 10 was powered off. If the distance between these two locations is greater than a predetermined distance, then the most recent vehicle location where the transition from driving mode to walking mode was recorded can be ignored. In this case, it can be assumed that the vehicle is no longer at the vehicle location. However, the user still has the option of selecting the last recorded vehicle location as an initial waypoint on a subsequent journey.

Likewise, the personal navigation device 10 can record the value of the clock 15 in the time data 28 section of the memory 20 for recording the time of the mode transition from driving mode to walking mode. Upon detecting that the personal navigation device 10 is powered on, the personal navigation device 10 can compare a time at which the personal navigation device 10 is powered on with the time of the mode transition from driving mode to walking mode. If the period of time that has elapsed between these two events is greater than a predetermined period of time, then the personal navigation device 10 can ignore the most recent vehicle location where the transition from driving mode to walking mode was recorded can be ignored. The user will not automatically be prompted with a question about returning to the last vehicle location, but the user still has the option of selecting the last recorded vehicle location as an initial waypoint on a subsequent journey.

In a typical usage scenario of the present invention, the user will drive to a location, park the vehicle, and walk to another location. The user can then give a command to the personal navigation device 10 to guide the user to another place, such as "Take me to First Bank". The user does not have to specifically tell the personal navigation device 10 to guide them back to the vehicle. Instead, the personal navigation device 10 will determine that the user needs the vehicle before later guiding the user to his next destination. The personal navigation device 10 can automatically decide if the user will be walking or driving to the next location according to the respective distances separating the locations as well as by threshold distances set by the user. Otherwise, if no automatic decision is to be made, the personal navigation device 10 can ask the user "Do you want to walk there or drive there?" The personal navigation device 10 can also provide the user with the distances between the current location, the vehicle location, and the destination location.

In summary, the present invention provides a method of recognizing that the users are traveling by foot by detecting the transition from driving mode to walking mode. The personal navigation device can then guide the user back to their vehicle before later guiding the user to their destination location. It is another advantage that the present invention offers the user a choice of walking back to the vehicle to drive to the destination location or walking directly to the destination location. This choice can also be made automatically according to the distance from either the vehicle location or the current location to the destination location for simplifying the navigation process for the user. The user can also be given the choice after finding out the relevant information about how far apart the various locations are from each other.

Those skilled in the art will readily observe that numerous modifications and alterations of the device and method may be made while retaining the teachings of the invention.

What is claimed is:

1. A method of assisting a user of a personal navigation device with automatically selecting a route after the personal navigation device transitions from driving mode to walking mode, the method comprising:

guiding the user to a first destination location by providing driving instructions with the personal navigation device to the first destination location;

detecting a mode transition in the personal navigation device from driving mode to walking mode;

recording a vehicle location where the mode transition from driving mode to walking mode occurs;

receiving a request from the user to create navigation instructions to a second destination location after detecting the mode transition in the personal navigation device from driving mode to walking mode and the vehicle location is recorded;

determining a distance from the current location to the second destination location in response to receiving the request from the user to create navigation instructions to the second destination location;

guiding the user back to the vehicle location by providing walking instructions with the personal navigation device when the distance from the current location to the second destination location is greater than or equal to a threshold distance and then guiding the user to the second destination location by providing driving instructions with the personal navigation device; and guiding the user to the second destination location directly by providing walking instructions with the personal navigation device when the distance from the current location to the second destination location is less than a threshold distance.

2. The method of claim 1, wherein detecting the mode transition in the personal navigation device from driving mode to walking mode is performed by detecting that the user picked a vehicle parking area as a penultimate waypoint on a most recent journey.

3. The method of claim 1, wherein detecting the mode transition in the personal navigation device from driving mode to walking mode is performed by detecting that the user asked for parking at the first destination location.

4. The method of claim 1, wherein detecting the mode transition in the personal navigation device from driving mode to walking mode is performed by detecting that the personal navigation device was removed from a cradle in a vehicle.

5. The method of claim 1, wherein detecting the mode transition in the personal navigation device from driving mode to walking mode is performed by detecting that the user manually changed the mode of the personal navigation device from driving mode to walking mode.

6. The method of claim 1, wherein detecting the mode transition in the personal navigation device from driving mode to walking mode is performed by detecting that the movement of the personal navigation device is consistent with driving movement and then detecting that the movement of the personal navigation device is consistent with walking movement.

7. The method of claim 1 further comprising:
recording the time of the mode transition in the personal navigation device from driving mode to walking mode;
detecting that the personal navigation device is powered off after recording the time of the mode transition in the personal navigation device from driving mode to walking mode;
detecting that the personal navigation device is powered on;
comparing a time at which the personal navigation device is powered on with the time of the mode transition from driving mode to walking mode; and
ignoring the most recent vehicle location when a period of time elapsed between the time of the mode transition and the time at which the personal navigation device is powered on is greater than a predetermined period of time.

8. The method of claim 1 further comprising calculating an estimated time of arrival to the second destination location while considering the walking instructions or driving instructions provided.

9. A method of assisting a user of a personal navigation device with automatically selecting a route after the personal navigation device transitions from driving mode to walking mode, the method comprising:
guiding the user to a first destination location by providing driving instructions with the personal navigation device to the first destination location;
detecting a mode transition in the personal navigation device from driving mode to walking mode;
recording a vehicle location where the mode transition from driving mode to walking mode occurs;
receiving a request from the user to create navigation instructions to a second destination location after detecting the mode transition in the personal navigation device from driving mode to walking mode and the vehicle location is recorded;
determining a distance from the vehicle location to the second destination location in response to receiving the request from the user to create navigation instructions to the second destination location;
guiding the user back to the vehicle location by providing walking instructions with the personal navigation device when the distance from the vehicle location to the second destination location is greater than or equal to a threshold distance and then guiding the user to the second destination location by providing driving instructions with the personal navigation device; and
guiding the user to the second destination location directly by providing walking instructions with the personal navigation device when the distance from the vehicle location to the second destination location is less than a threshold distance.

10. The method of claim 9, wherein detecting the mode transition in the personal navigation device from driving mode to walking mode is performed by detecting that the user picked a vehicle parking area as a penultimate waypoint on a most recent journey.

11. The method of claim 9, wherein detecting the mode transition in the personal navigation device from driving mode to walking mode is performed by detecting that the user asked for parking at the first destination location.

12. The method of claim 9, wherein detecting the mode transition in the personal navigation device from driving mode to walking mode is performed by detecting that the personal navigation device was removed from a cradle in a vehicle.

13. The method of claim 9, wherein detecting the mode transition in the personal navigation device from driving mode to walking mode is performed by detecting that the user manually changed the mode of the personal navigation device from driving mode to walking mode.

14. The method of claim 9, wherein detecting the mode transition in the personal navigation device from driving mode to walking mode is performed by detecting that the movement of the personal navigation device is consistent with driving movement and then detecting that the movement of the personal navigation device is consistent with walking movement.

15. The method of claim 9 further comprising:
recording the time of the mode transition in the personal navigation device from driving mode to walking mode;
detecting that the personal navigation device is powered off after recording the time of the mode transition in the personal navigation device from driving mode to walking mode;
detecting that the personal navigation device is powered on;
comparing a time at which the personal navigation device is powered on with the time of the mode transition from driving mode to walking mode; and
ignoring the most recent vehicle location when a period of time elapsed between the time of the mode transition and the time at which the personal navigation device is powered on is greater than a predetermined period of time.

16. The method of claim 9 further comprising calculating an estimated time of arrival to the second destination location while considering the walking instructions or driving instructions provided.

17. The method of claim 1 further comprising:
detecting that the personal navigation device is powered on;
comparing a location where the personal navigation device is powered on with a location where the personal navigation device was powered off; and
ignoring the most recent vehicle location when a distance between the location where the personal navigation device is powered on and the location where the personal navigation device was powered off is greater than a predetermined distance.

18. The method of claim 9 further comprising:
detecting that the personal navigation device is powered on;
comparing a location where the personal navigation device is powered on with a location where the personal navigation device was powered off; and
ignoring the most recent vehicle location when a distance between the location where the personal navigation device is powered on and the location where the personal navigation device was powered off is greater than a predetermined distance.

* * * * *